US012800298B2

(12) United States Patent
Gomez Zubicaray et al.

(10) Patent No.: US 12,800,298 B2
(45) Date of Patent: Nov. 17, 2026

(54) METHOD AND APPARATUS FOR MANUFACTURING AND INSPECTING A METAL CONTAINER

(71) Applicants: TECH PRO PACKAG, S.L., Amurrio (ES); INGENET AUTOMATIZACION, S.L., Orozko (ES)

(72) Inventors: Unai Gomez Zubicaray, Amurrio (ES); Xabier Udaeta San Martín, Amurrio (ES)

(73) Assignees: TECH PRO PACKAG, S.L., Amurrio (ES); INGENET AUTOMATIZACION, S.L., Orozko (ES)

( * ) Notice: Subject to any disclaimer, the term of this patent is extended or adjusted under 35 U.S.C. 154(b) by 80 days.

(21) Appl. No.: 19/194,797

(22) Filed: Apr. 30, 2025

(65) Prior Publication Data

US 2025/0347513 A1 Nov. 13, 2025

(30) Foreign Application Priority Data

May 7, 2024 (EP) .................................... 24382499

(51) Int. Cl.

| | |
|---|---|
| ***G01B 15/02*** | (2006.01) |
| ***B21C 51/00*** | (2006.01) |
| ***G01B 11/24*** | (2006.01) |
| *B21D 22/28* | (2006.01) |

(52) U.S. Cl.

CPC ............ *G01B 15/025* (2013.01); *B21C 51/00* (2013.01); *G01B 11/24* (2013.01); *B21D 22/28* (2013.01)

(58) Field of Classification Search

None

See application file for complete search history.

(56) References Cited

U.S. PATENT DOCUMENTS

| | | | | |
|---|---|---|---|---|
| 4,165,939 | A | 8/1979 | Woodrow et al. | |
| 2004/0028177 | A1* | 2/2004 | Pipino | G01N 23/04 378/57 |
| 2020/0333133 | A1* | 10/2020 | Cosneau | B07C 5/126 |
| 2026/0235537 | A1* | 8/2026 | Mäntylä | G01N 23/16 |

FOREIGN PATENT DOCUMENTS

| | | | |
|---|---|---|---|
| CN | 117647188 | A | 3/2024 |
| EP | 3404357 | A1 | 11/2018 |
| EP | 4163588 | A1 | 4/2023 |

* cited by examiner

*Primary Examiner* — Hoon K Song

(74) *Attorney, Agent, or Firm* — Edell, Shapiro & Finnan, LLC

(57) ABSTRACT

A method and apparatus for manufacturing and inspecting a metal container. The method includes inspecting the base of the metal container using both X-ray equipment and a distance meter. The X-ray equipment is used to perform a first inspection to obtain a first set of points of the base with thickness values. The distance meter is used to perform a second inspection to obtain a second set of points with distance values with respect to the base. The method includes obtaining a profile of the base and the thickness of the profile by correlating the first and second sets of points such that for each of the points a thickness value and a distance value is obtained.

20 Claims, 10 Drawing Sheets

METHOD AND APPARATUS FOR MANUFACTURING AND INSPECTING A METAL CONTAINER

CROSS REFERENCE TO RELATED APPLICATIONS

This application relates to and claims the benefit and priority to European Application No. EP24382499.2, filed May 7, 2024, which is incorporated by reference herein in its entirety.

TECHNICAL FIELD

The present invention relates to the manufacture of metal containers and the inspection thereof.

BACKGROUND

Metal containers for containing beverages, food, or cosmetic and pharmaceutical products such as, for example, beverage cans, aerosols for deodorants, etc., are known. Metal containers of this type are manufactured in continuous manufacturing lines from a metal disc, generally an aluminum or steel disc, which is subjected to hot extrusion in an extrusion press in a process called DWI "Draw and Wall Iron".

In this manner, the metal disc is first extruded in the extrusion press to form a metal container comprising a cylindrical body comprising a cylindrical body with a side wall, a base, and an open end opposite the base. In a subsequent phase, the cylindrical body of the container is deformed in a neck forming machine (necking machine) to form a neck at its open end, and finally the container is completed entirely by, for example, in the case of aerosols, placing a sprayer in the neck of the container. Furthermore, the manufacturing process comprises other operations of washing, applying linings on, painting, and screen printing the container, among others.

Technological progress in metal transformation processes has led to containers that have increasingly smaller thicknesses, so it is essential to control container thickness in order to detect the appearance of defects which may compromise the structural integrity of the container.

Generally, container inspection is performed in a machine external to the container manufacturing line once the container is completed. Various dimensional parameters of the container are controlled, among them, the side walls, or in the case of aerosols, the attachment between the neck of the container and the sprayer, are inspected using measurement sensors such as, for example, lasers. Nevertheless, controlling the thickness of the base of the container is particularly relevant because this parameter is directly related with the metal disc extrusion process that takes place at the beginning of the metal transformation process, i.e., the thickness of the base of the container is essentially defined in the extrusion press, and any defect in the thickness of the base has a bearing on the entire line, with resources being wasted in manufacturing a container that will be rejected.

EP4163588A1 shows a method which allows the thickness of the base of a metal container to be determined on the container manufacturing line itself with an X-ray equipment having an X-ray emitter and an X-ray receiver, whereby it is possible to find out whether the container thickness is erroneous before manufacture of the container is completed.

SUMMARY

Disclosed are processes and installations for manufacturing and inspecting a metal container.

One aspect of the invention relates to a process for manufacturing and inspecting a metal container having a cylindrical body with a side wall, a base and an open end opposite the base, and the base has an inner face located inside the metal container and an outer face located outside the metal container.

The manufacturing and inspection process comprises providing a metal disc, extruding the metal disc to form the metal container, moving the metal container in a forward direction, and inspecting the base of the metal container.

The inspection comprises:

- performing a first inspection of the base of the metal container with X-ray equipment having an X-ray emitter and an X-ray receiver, wherein the first inspection comprises:
  - arranging the metal container between the X-ray emitter and the X-ray receiver, emitting an X-ray beam from the X-ray emitter towards the X-ray receiver through a first area of the base of the metal container, part of the X-ray intensity being absorbed by the base of the metal container, obtaining a first set of points of the first area of the base of the metal container, and determining a thickness value "e" for each of the points of the first area as a function of the X-ray intensity absorbed by the base of the metal container, and the inspection additionally comprises:
- performing a second inspection of the base of the metal container with a distance meter having a light emitter and a light receiver, wherein the second inspection comprises:
  - moving the metal container in the forward direction with the base of the metal container facing the light emitter, emitting a light beam from the light emitter incident on at least one point of the base of the metal container and receiving the light reflected from the base at the light receiver, so that during the movement of the metal container in the forward direction, the light beam is incident on a second area of the base of the metal container, obtaining a second set of points of the second area of the base of the metal container, and determine a distance value "d" for each of the points of the second area of the base of the metal container with respect to a common reference position, and
- relating the first set of points of the first area of the base of the metal container obtained with the X-ray equipment to the second set of points of the second area of the base of the metal container obtained with the distance meter, wherein the points of the second area correspond to the points of the first area, such that for each of the points of the base of the metal container a thickness value "e" and a distance value "d" are obtained, such that a profile of the base of the metal container and the thickness of said profile is obtained.

Another aspect of the invention relates to an installation for carrying out the above-mentioned process.

The thickness of the base of the metal container can vary in any area of the base for various reasons, for example, due to defects in the starting material of the metal disc, due to a misalignment of the extruder shaft of the extrusion press when the metal disc is extruded, due to expansions or shrinkages of the extruder shaft as a result of the press temperature, among others. Inspection with X-rays allows the thickness at any point of the base of the container to be determined, and to know if the thickness of all the points is within acceptable values. However, the X-ray inspection does not allow the shape or profile of the base of the metal container to be obtained directly, so that, even if the thickness is within acceptable values, the profile of the base may have imperfections that make it necessary to discard the container. The combination of measuring the thickness with X-rays and obtaining the profile with the distance meter makes it possible to obtain the profile of the base of the container quickly and easily, together with the thickness of all the points of said profile. In addition, the combination of both inspections with the X-ray and the distance meter allows the profile of the outer and inner face of the base of the metal container to be obtained.

These and other advantages and features will become apparent in view of the figures and the detailed description.

DETAILED DESCRIPTION

Figure 1:
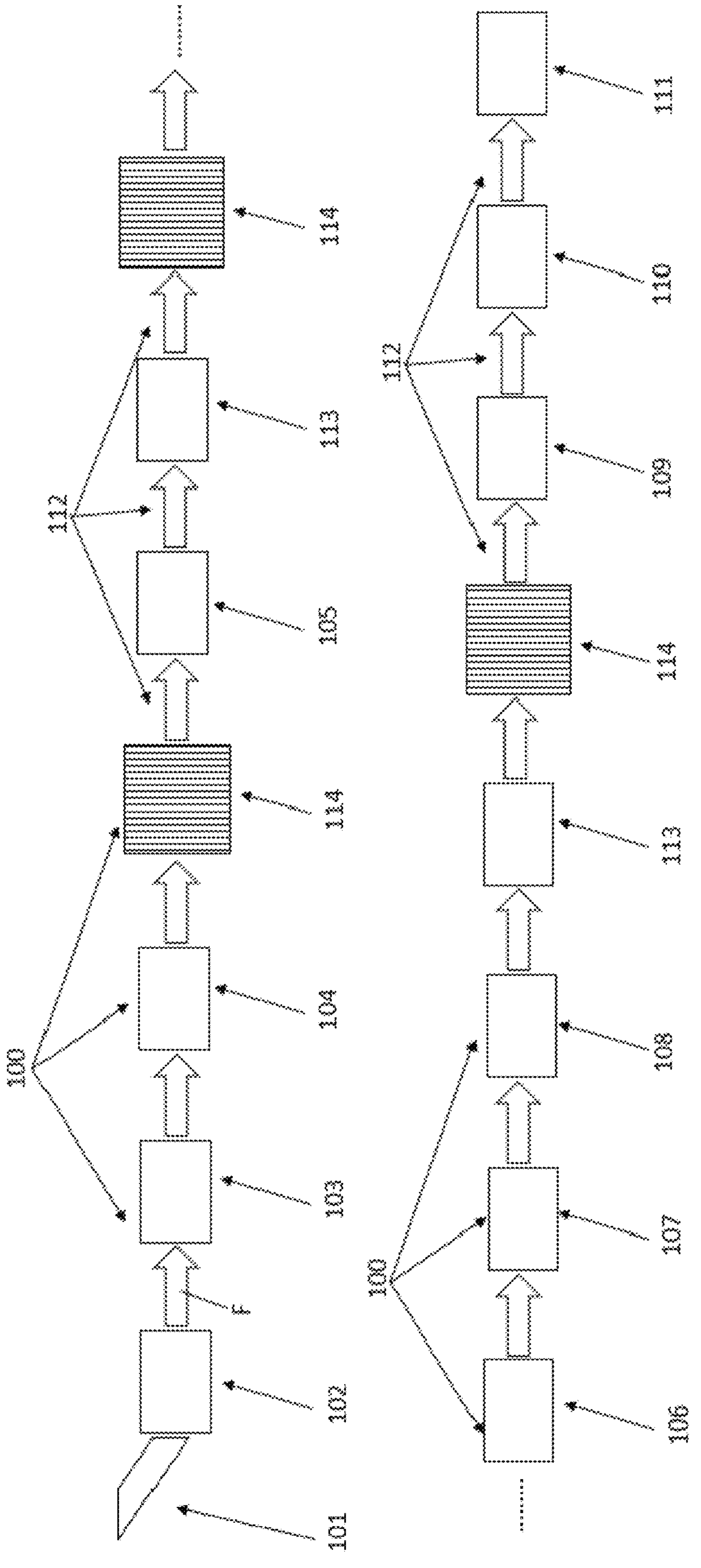
FIG. 1 shows a block diagram of an example of an installation for manufacturing metal containers.

The manufacture of metal containers, particularly aluminum or steel containers, for containing beverages, food, or cosmetic and pharmaceutical products (cans of beverages, aerosols, etc.), requires a process in which different machines 100 arranged in an installation for manufacturing metal containers 10 are used. Machines of different types can be used depending on the operations that must be performed to manufacture the container 10, and the machines can be arranged in different ways in the installation. In the installation, containers are processed continuously on a container manufacturing line.

The machines 100 are automatically connected by means of transfer units 112, such as linear conveyor belts, rotating carousels, or similar elements, which transfer the containers 10 from one machine 100 to another. The manufacturing line is a high-speed line, where the order of 200 containers can be processed per minute.

FIG. 1 shows a block diagram of a non-limiting example of an installation for manufacturing metal containers. The installation comprises a feeder 101 for supplying metal discs 1, an extrusion press 102 for extruding the metal discs 1 and forming metal containers 10, a cutter 103 for trimming the length of the container 10, a washing and drying assembly 104 for cleaning the container 10 after extrusion, an interior varnishing machine 105 for applying a lining on the interior of the containers 10, a varnishing machine 106 for covering the outside of the container 10 before printing a design, a decorating machine 107 for printing the design on the container 10, a glazing machine 108 for externally covering the container 10 to protect the print, a neck forming machine 109 for forming the neck of the container 10, a crack detector 110 for detecting microcracks in any area of the completed container 10, and a packaging machine 111. The installation is completed with the transfer units 112 for transferring the containers 10 from one machine 100 to another in a forward direction F, ovens and chillers 113 which dry and harden the various coatings applied on the container 10, and accumulators 114 which allow the accumulation of the containers 10 to enable synchronizing the speed of all the machines 100 of the installation. One oven 113 is arranged after the interior varnishing machine 105 followed by an accumulator 114 and another oven 113 is arranged after the glazing machine 108 followed by another accumulator 114. Another accumulator 114 is arranged after the washing and drying assembly 104.

Although the machines 100 can be arranged in different ways and different types of machines 100 can be used, every installation for manufacturing metal containers 10 comprises at the beginning of the installation a feeder 101 for supplying metal discs 1, and then an extrusion press 102 for extruding the metal discs 1 and forming metal containers 10.

A metal container 10 has a cylindrical body 11 with a side wall 12, a base 13 and an open end 14 opposite the base 13, and the base 13 has an inner face 15 located inside the metal container 10 and an outer face 16 located outside the metal container 10.

Figure 2:
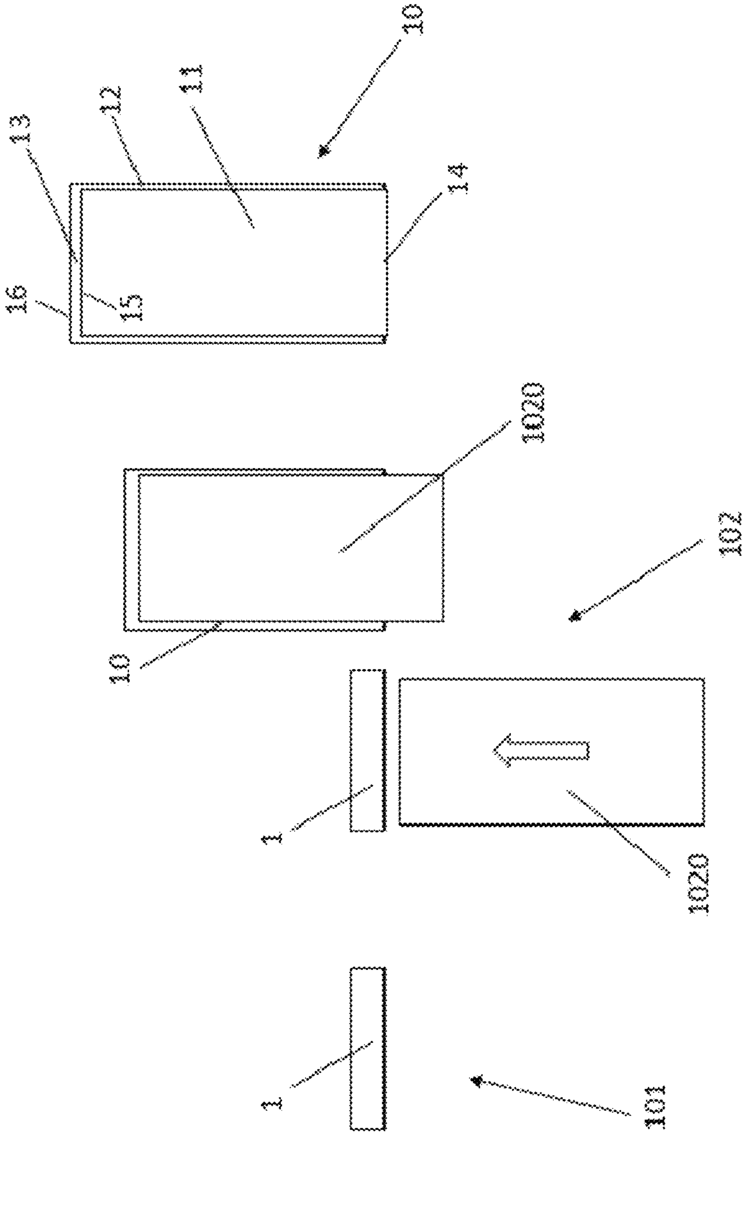
FIG. 2 shows a schematic example of the transformation of a metal disc into a metal container using an extruder of an extrusion press.

FIG. 2 shows a schematic example of the transformation of a metal disc 1 into a container 10 by means of an extruder 1020 of the extrusion press 102 which forces the deformation of the material of the disc 1 and the transformation thereof into the container 10.

The invention proposes a process for manufacturing and inspecting a metal container 10 comprising providing a metal disc 1, extruding the metal disc 1 to form the metal container 10, moving the metal container 10 in a forward direction F, and inspecting the base 13 of the metal container 10.

Figure 3:
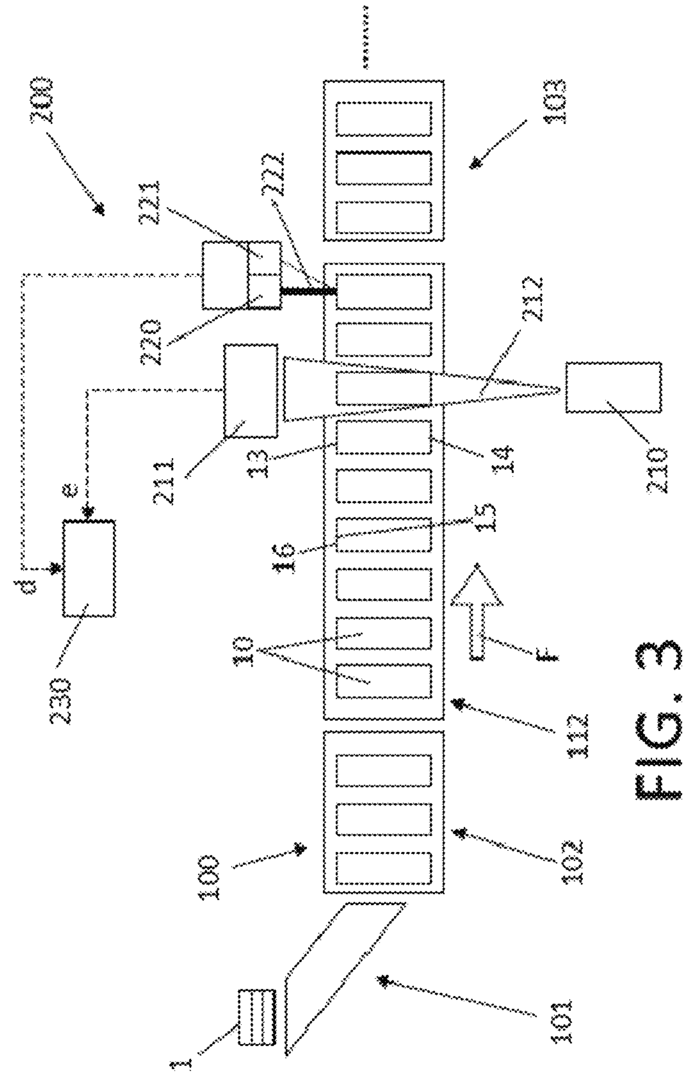
FIG. 3 shows a schematic of an inspection unit with X-ray equipment and a distance meter.

As shown in FIG. 3, the inspection of the base 13 of the metal containers 10 is performed by an inspection unit 200 comprising an X-ray equipment having an X-ray emitter 210 and an X-ray receiver 211 to obtain thickness values "e", and a distance meter having a light emitter 220 and a light receiver 221 to obtain distance values "d". The inspection unit comprises a control unit 230 which receives the thickness "e" and distance "d" values to obtain the profile P of the base 13 of the metal container and the thickness of said profile P as will be described below. The control unit 230 may comprise a controller, a processor, a microprocessor, an FPGA or any other computationally capable device.

Preferably, the inspection unit 200 is arranged at the outlet of the extrusion press 102, even more preferably at the transfer unit 112 which transfers the freshly extruded containers 10 from the extrusion press 102 to the next machine 100 of the installation, for example, the cutter 113. In this way, any metal containers 10 that do not meet the thickness specifications can be discarded before they are processed on the next machines 100 of the installation. However, the inspection unit 200 can be located at any point in the manufacturing line.

The inspection comprises a first inspection of the base 13 of the metal container 10 with the X-ray equipment, and a second inspection of the base 13 of the metal container 10 with the distance meter.

Figure 4:
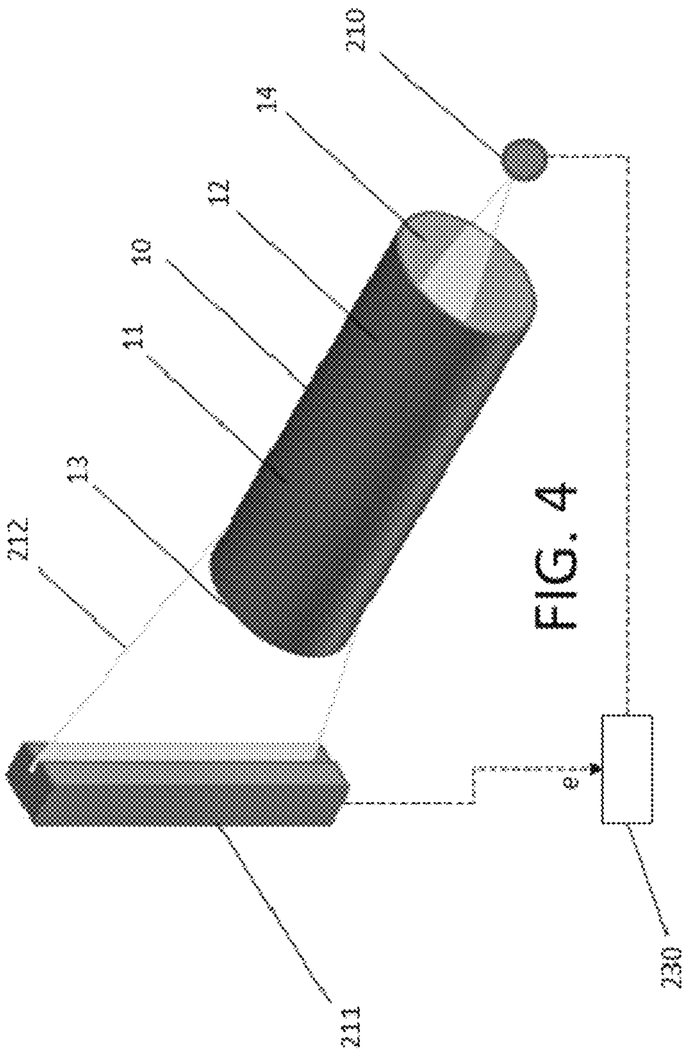
FIG. 4 shows an example of the X-ray equipment of the inspection unit.
Figures 6A, 6B:
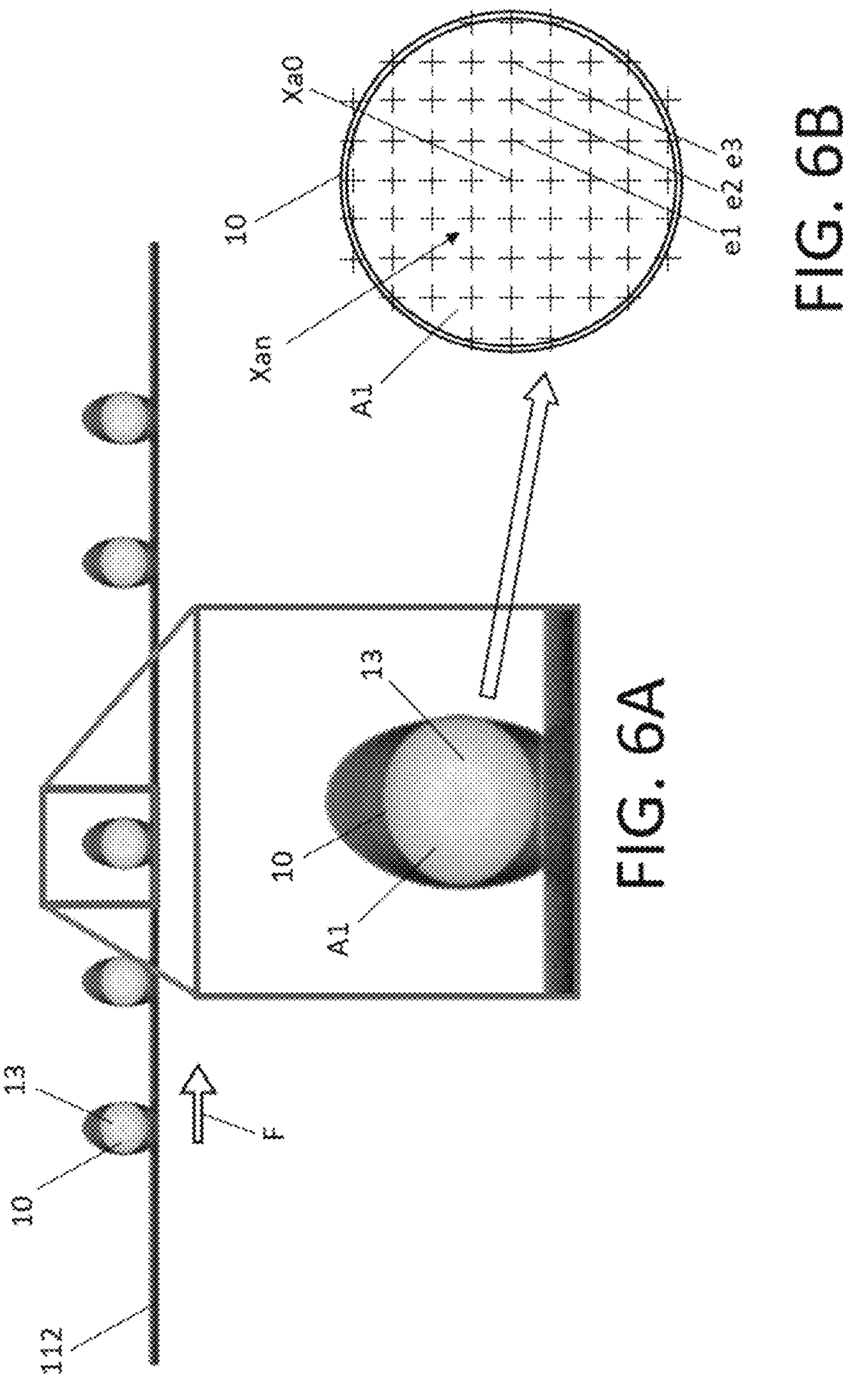
FIG. 6A shows an example of the first inspection with the X-ray equipment and FIG. 6B shows the first set of points obtained with said inspection.

As shown in FIGS. 4, 6A and 6B, the first inspection with the X-ray equipment comprises arranging the metal container 10 between the X-ray emitter 210 and the X-ray receiver 211, emitting an X-ray beam 212 from the X-ray emitter 210 towards the X-ray receiver 211 through a first area A1 of the base 13 of the metal container 10, part of the X-ray intensity being absorbed by the base 13 of the metal container 10, obtaining a first set of points Xan of the first area A1 of the base 13 of the metal container 10, and determining a thickness value "e" for each of the points Xan of the first area A1 as a function of the X-ray intensity absorbed by the base 13 of the metal container 10.

As seen in FIGS. 5, 7A, 7B, 8A and 8B, the second inspection with the distance meter comprises moving the metal container 10 in the forward direction F with the base 13 of the metal container 10 facing the light emitter 220, emitting a light beam 222 from the light emitter 220 incident on at least one point on the base 13 of the metal container 10 and receiving the light reflected from the base 13 at the light receiver 221, so that during movement of the metal container 10 in the forward direction F, the light beam 220 is incident on a second area A2 of the base 13 of the metal container 10, obtaining a second set of points Xbn of the second area A2 of the base 13 of the metal container 10, and determining a distance value "d" for each of the points Xbn of the second area A2 of the base 13 of the metal container 10 with respect to a common reference position ref.

The method further comprises relating the first set of points Xan of the first area A1 of the base 13 of the metal container 10 obtained with the X-ray equipment to the second set of points Xbn of the second area A2 of the base 13 of the metal container 10 obtained with the distance meter, wherein the points Xbn of the second area A2 correspond to the points Xan of the first area A1, so that for each of the points Xan and Xbn of the base 13 of the metal container 10 a thickness value "e" and a distance value "d" is obtained, such that a profile P of the base 13 of the metal container 10 and the thickness of this profile P is obtained.

For example, the profile P can be obtained by joining the points Xbn of the second set of points Xbn.

The first set of points Xan with thickness values "e" and the second set of points Xbn with distance values "d" are related to each other to match the points Xan and Xbn, so that each point on the base 13 of the metal container 10 has a thickness value "e" and a distance value "d" with respect to the common reference position "ref". For example, the center point Xa0 of the first set of points Xan may be made to coincide with the center point Xbo of the second set of points Xbn.

Figure 5:
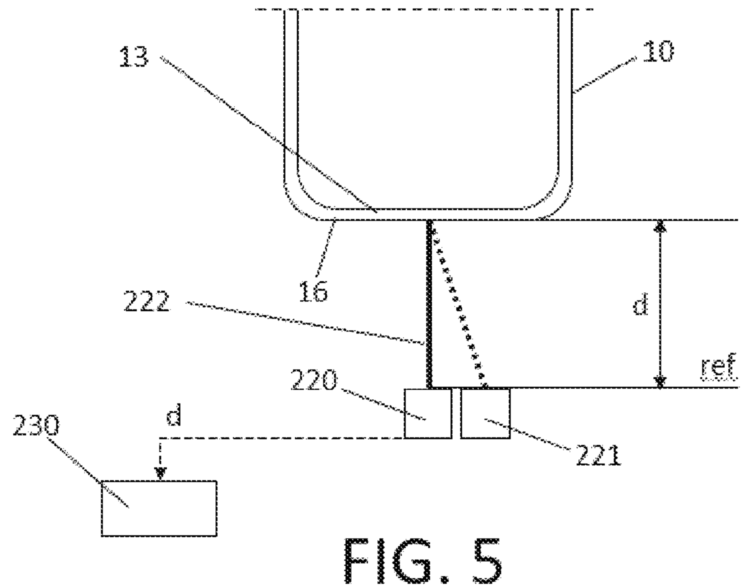
FIG. 5 shows an example of the distance meter of the inspection unit.

For example, as shown in FIG. 5, the common reference position "ref" may be the position at which the distance meter 220 is arranged, for example, the emission point of the distance meter 220 from which the light beam 222 is emitted.

Figure 9A:
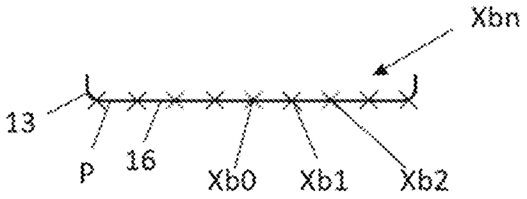
FIGS. 9A, 9B and 9C show the combination of the distance and thickness values to obtain the profile of the base of the metal container and the thickness of said profile.
Figure 9B:
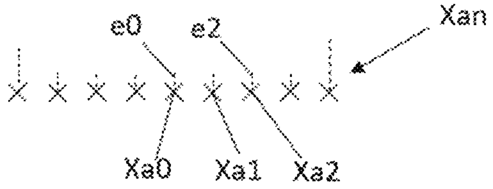
Figure 9C:
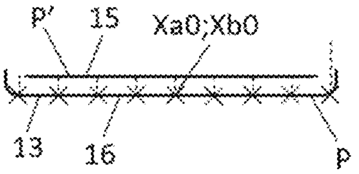

Preferably, as shown in FIG. 9A, the second set of points Xbn obtained with the X-ray equipment corresponds to the profile P of one of the faces 16 of the base 13 of the metal container 10, and by adding to each of the points Xbn of the second set of points Xbn the thickness values "e" obtained with the X-ray equipment (see FIG. 9B), the profile P' of the other face 15 of the base 13 of the metal container 10 is obtained, as shown in FIG. 9C. In this way, the profile P of the outer face 16 and the profile P' of the inner face 15 of the base 13 of the metal container 10 are obtained, as well as the thickness in any area defined between both profiles P and P'.

The number of Xan and Xbn points may depend on the required accuracy of the process. For example, in the first inspection with the X-ray equipment, an X-ray image may be obtained, and each pixel of the X-ray image may correspond to one point Xan of the first set of Xan points. For example, each point Xbn of the second set of points Xb may correspond to at least one pixel of the X-ray image.

Figure 7A:
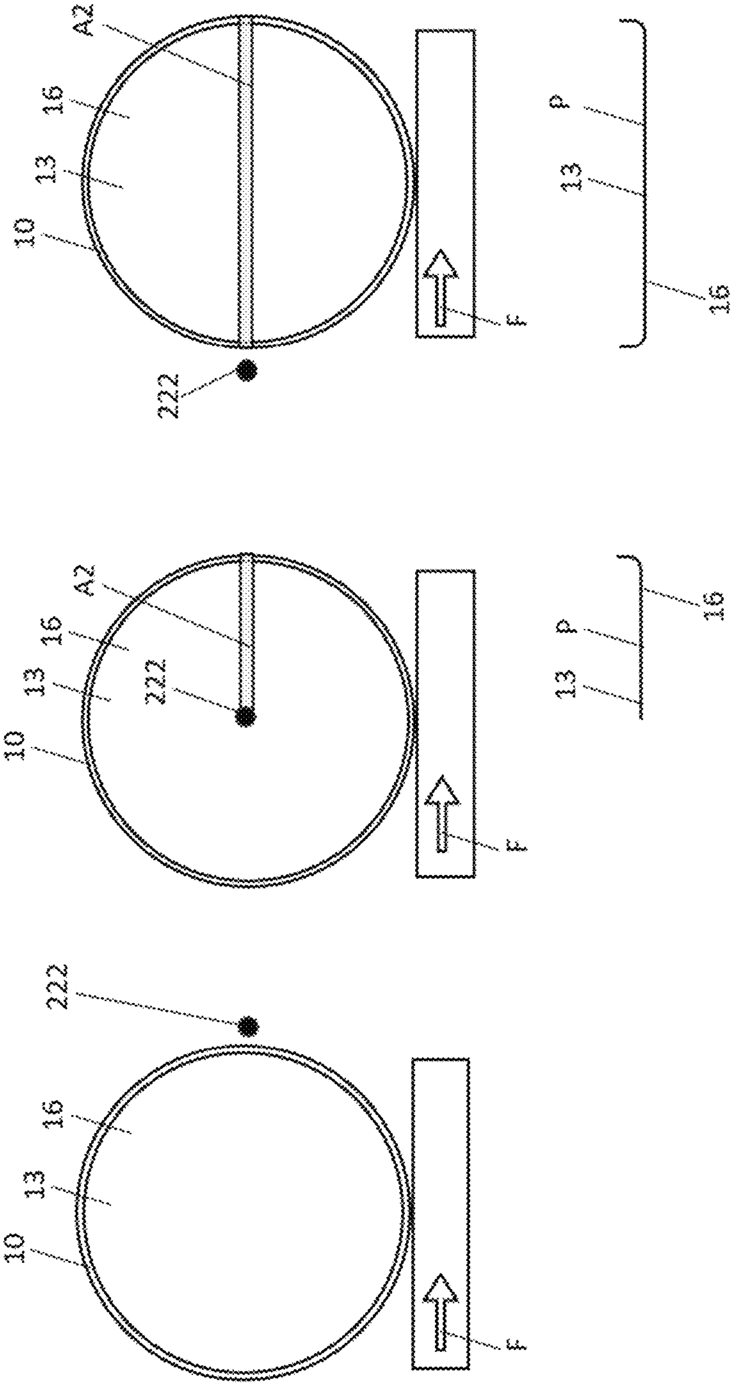
FIG. 7A shows an example of the second inspection with a distance meter emitting a light beam with a point shape and FIG. 7B shows the second set of points obtained with said an inspection.
Figure 7B:
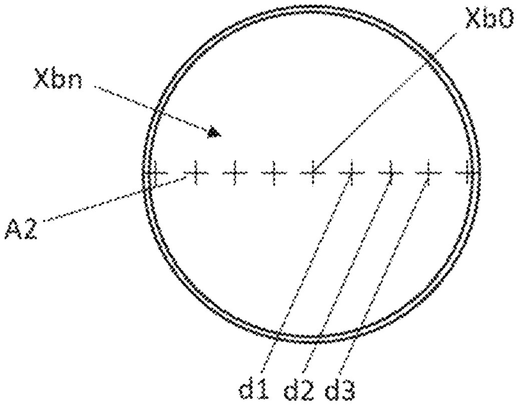

Preferably, as shown in the example of FIG. 7A, the second inspection comprises emitting a light beam 222 with a point shape incident on a single point of the base 13 of the metal container 10, such that during the movement of the metal container 10 in the forward direction F, the light beam 222 is incident on a second area A2 of the base 13 of the metal container 10 having a linear shape, so that after relating the first set of points Xan of the first area A1 to the second set of points Xbn of the second area A2, a profile P of the base 13 of the metal container 10 having a linear shape and the thickness of each point of said linear shape is obtained. FIG. 7B shows that the second set of points Xbn is a linear succession of points corresponding to the second area A2 swept by the point shape of the light beam 222 during the displacement of the metal container 10 in the forward direction F.

Figure 8B:
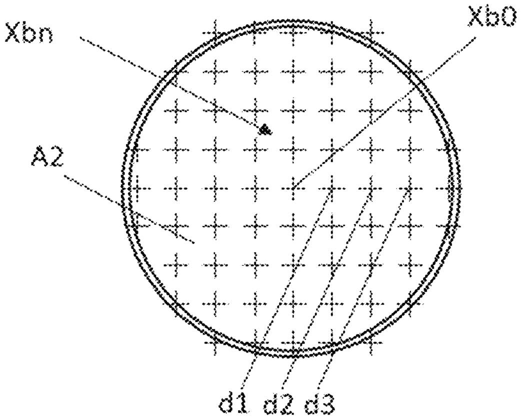
FIG. 8A shows another example of the second inspection with a distance meter emitting a light beam with a linear shape and FIG. 8B shows the second set of points obtained with such an inspection.
Figure 8A:
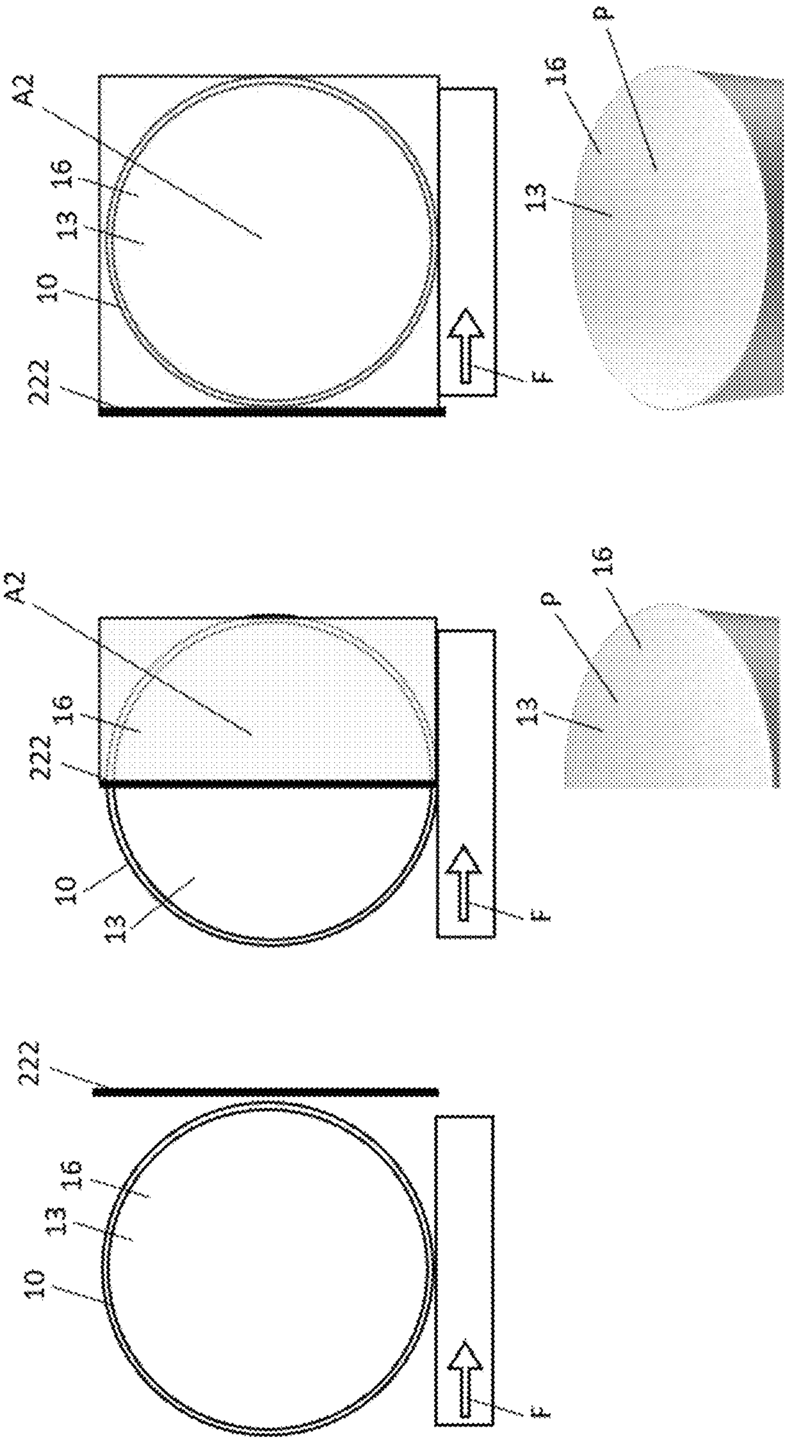

Even more preferably, as shown in the example of FIG. 8A, the second inspection comprises emitting a light beam 222 with a linear shape incident on several points of the base 13 of the metal container 10, such that during movement of the metal container 10 in the forward direction F, the light beam 220 is incident on a second area A2 of the base 13 of the metal container 10 covering the entire base 13 of the metal container 10, so that after relating the first set of points Xan of the first area A1 to the second set of points Xbn of the second area A2, a profile P of the base 13 of the metal container 10 with a three-dimensional shape and the thickness of each point of said three-dimensional shape is obtained. FIG. 8B shows that the second set of points Xbn is a cloud of points covering the entire base 13 corresponding to the area A2 swept by the linear shape of the light beam 222 during the movement of the metal container 10.

Preferably, the light emitter 220 of the example of FIG. 8A is a laser profilometer that emits a light profile 222 that sweeps the entire base 13 of the metal container 10 during the movement of the metal container 10 in the forward direction F. Preferably, the light profile 222 has a width equal to or greater than the diameter of the base 13.

Preferably, the light emitter 220 emits the light beam 222 with a focal center that is aligned with the center of the base 13 of the metal container 10. For example, when the light beam 222 has a point shape, the focal center coincides with said point shape, and when the light beam 222 has a linear shape, the focal center coincides with the center of said linear shape.

Preferably, the first inspection and the second inspection are performed in motion while the metal container 10 is moving in the forward direction F. Alternatively, the first X-ray inspection may be performed with the metal container 10 stationary. Accordingly, the first inspection and the second inspection may be performed at different points of the installation, however it is preferable to perform both inspections at the exit of the extrusion press 102.

X-rays are a high-energy (ionizing) electromagnetic radiation the wavelength of which is between $10^{-9}$ m and $10^{-12}$ m. Based on its energetic nature, this radiation is capable of going through materials of a different nature and thickness. The emitted X-rays have an essentially uniform intensity distribution before striking the container and photon absorption and scattering upon interacting with the material of the container give rise to an alteration in the X-rays, which contains information about the structures the X-rays go through. The intensity of the X-rays going through the material is attenuated depending on the thickness of said material, therefore the thickness of the material can be determined by recording the unabsorbed intensity. X-ray absorption in a material is governed by the Beer-Lambert Law which allows knowing the values of the intensity transmitted by the material. As shown in the following equation, this Law indicates that transmitted radiation experiences an exponential decay as it goes through a material.

$$I=I_0e^{-\mu t} \quad [1]$$

where:

$I_0$ is the intensity of the X-rays emitted by the X-ray emitter,

I is intensity of the X-rays received in the X-ray receiver,

μ is the absorption coefficient of the material of the base of the container, and t is the thickness of the material of the base of the container.

Preferably, as seen in FIGS. 3 and 4, the X-ray emitter 210 and the X-ray receiver 211 are positioned outside the metal container 10 with the X-ray emitter 210 facing the inner face 15 of the base 13, and the X-ray receiver 211 facing the outer face 16 of the base 13, and to determine the thickness value "e" of each of the points Xan of the first area A1 of the base 13, the X-ray beam 212 is emitted at a first intensity from the X-ray emitter 210 through the open end 14 of the metal container 10 towards the inner face 15 of the base 13, passing the X-ray beam 212 through the base 13, and the X-ray beam 212 is received at the X-ray receiver 211 with a second intensity lower than the first intensity, and the thickness of the base 13 is determined by the first and second intensities.

Even more preferably, and as seen in FIG. 4, the X-ray emitter 210 emits the X-ray beam 212 with a focal center that is aligned with the center of the base 13 of the metal container 10. The center of the focal point is therefore approximately aligned with the center of the base 13 of the containers 10 so that geometrical distortion as a result of conicity and other effects are symmetrical with respect to the center of the base of the containers 10.

The X-ray receiver 211 receives the X-rays after passing through the base 13 of the container 10 and obtains an X-ray intensity signal corresponding to the intensity emitted by the X-ray emitter 210 minus the intensity absorbed by the base 13 of the container 10, the absorbed intensity being proportional to the thickness of the base of the container. The X-ray receiver 211 also makes it possible to obtain an X-ray image of the base of the container in grey scale, these shades of grey being proportional to the absorbed intensity and therefore proportional to the thickness of the base of the container.

The control unit 230 is responsible for processing the signal obtained at the X-ray receiver 211 to determine the thickness of the base 13 of the containers 10 as a function of the X-ray intensity absorbed by the base 13.

The thickness of the base 13 of the container 10 is determined by comparing the intensity of the X-rays received in the receiver 21 after going through the base 13 with a transfer function linking intensity values with thicknesses of the material of the metal containers 10, wherein the transfer function is:

$$-\mathrm{Ln}[I/I_0]=\mu t$$

where:

$I_0$ is the intensity of the X-rays emitted by the X-ray emitter 20,

I is the intensity of the X-rays received in the X-ray receiver 21,

μ is the absorption coefficient of the material of the base 13 of the metal container 10, and t is the thickness of the material of the base 13 of the metal container 10.

The transfer function corresponds with a standard curve as illustrated in FIG. 5. Said standard curve is obtained from known thickness values of the material of the metal containers 10 and the X-ray transmittance of which has been previously calculated. The standard curve links thickness values with the mathematical expression indicated above: $\mathrm{Ln}[I/I_0]$ To obtain the standard curve, parts that are completely flat and have a constant thickness of the metal containers 10 themselves may be used. First, the actual thickness of those parts is determined using precision equipment and then the intensity of the rays absorbed by said parts is determined using inspection equipment 200. Accordingly, actual thickness values of the containers 10 are obtained, and the behavior of said containers relative to the X-rays is known from each of said values, such that when a metal container 10 is inspected with the inspection unit 200 in the installation, it is possible to know its thickness using the previously calculated standard curve.

As shown in FIG. 6A, an X-ray image of each of the inspected metal containers 10 is obtained, and the X-ray image is made up of areas that have been previously calibrated with the standard curve for associating a thickness with each area. Specifically, each pixel of the image is associated with a thickness value that has been obtained with the standard curve. Likewise, each pixel has a grey level, said grey level being associated with a thickness value that has also been determined using the standard curve. In other words, an X-ray image of the base of the metal container is obtained, in which each pixel of the image is coded with a thickness value. Each pixel may correspond to one of the Xan points of the first set of Xan points.

The invention claimed is:

1. A method for inspecting a metal container having a base and an open end opposite the base, the base having an inner face located inside the metal container and an outer face located outside the metal container, the method comprising:

arranging the base of the metal container between an X-ray emitter and an X-ray receiver, and emitting an X-ray beam having a first intensity from the X-ray emitter towards the X-ray receiver through a first set of points of the base, the X-ray receiver receiving the X-ray beam at a second intensity less than the first intensity as a result of X-ray beam absorption at the first set of points of the base;

determining a thickness value of the base at the location of each of the first set of points as a function of a difference between the first intensity and the second intensity;

while moving the base in a forward direction, positioning the base to face a light emitter that emits a light beam incident on two or more of the first set of points so that the light beam is reflected from the base; and receiving the light beam reflected by the base at a light receiver and determining a distance value for each of the two or more of the first set of points with respect to a common reference position.

2. The method for inspecting a metal container according to claim 1, further comprising producing a profile of the base using the determined distance value for each of the two or more of the first set of points.

3. The method for inspecting a metal container according to claim 2, further comprising determining one or more thicknesses of the profile using the determined thickness value for each of the two or more of the first set of points.

4. The method for inspecting a metal container according to claim 1, wherein the two or more of the first set of points are arranged in a linear row and the light emitter emits a point shaped light beam that consecutively impinges on the two or more of the first set of points as the base is moved in the forward direction.

5. The method for inspecting a metal container according to claim 4, further comprising producing a linear shaped profile of a portion of the base using the determined distance value for each of the two or more of the first set of points.

6. The method for inspecting a metal container according to claim 1, wherein the light beam has a linear shape such that as the base is moved in the forward direction the light beam impinges on an entirety of the inner or outer face of the base that includes the two or more of the first set of points.

7. The method for inspecting a metal container according to claim 6, further comprising producing a three-dimensional shaped profile of the base using the determined distance value for each of the two or more of the first set of points.

8. The method for inspecting a metal container according to claim 7, further comprising determining one or more thicknesses of the three-dimensional shaped profile using the determined thickness value for each of the two or more of the first set of points.

9. The method for inspecting a metal container according to claim 3, wherein the outer face of the base is positioned to face the light emitter such that the profile of the base is a profile of the outer face, the method further comprising producing a profile of the inner face of the base using the profile of the outer face and the determined thickness value for each of the two or more of the first set of points.

10. The method for inspecting a metal container according to claim 3, wherein the inner face of the base is positioned to face the light emitter such that the profile of the base is a profile of the inner face, the method further comprising producing a profile of the outer face of the base using the profile of the inner face and the determined thickness value for each of the two or more of the first set of points.

11. The method for inspecting a metal container according to claim 1, wherein the base is moved in the forward direction while the X-ray beam is emitted by the X-ray emitter.

12. The method for inspecting a metal container according to claim 1, wherein each of the X-ray emitter and X-ray receiver is located outside the metal container, and the X-ray emitter is arranged facing the inner face of the base and the X-ray receiver is arranged facing the outer face of the base.

13. The method for inspecting a metal container according to claim 1, wherein the X-ray emitter emits the X-ray beam with a focal center that is aligned with a center of the base.

14. The method for inspecting a metal container according to claim 1, wherein each of the light emitter and light receiver is positioned outside the metal container with the light emitter facing the outer face of the base.

15. The method for inspecting a metal container according to claim 1, wherein the light emitter emits the light beam with a focal center that is aligned with a center of the base.

16. An assembly for inspecting a metal container having a base and an open end opposite the base, the base having an inner face located inside the metal container and an outer face located outside the metal container, the assembly comprising:

an X-ray emitter;

an X-ray receiver, the X-ray emitter configured to emit an X-ray beam of a first intensity towards the X-ray receiver through a first set of points of the base, the X-ray receiver configured to receive the X-ray beam at a second intensity less than the first intensity as a result of X-ray beam absorption at the first set of points of the base;

a first computational device that is configured to determine a thickness value of the base at the location of each of the first set of points as a function of a difference between the first intensity and the second intensity;

a light emitter that is configured to emit a light beam incident on one or more of the first set of points so that the light beam is reflected from the base;

at light receiver configured to receive the light beam reflected by the base; and the first computational device or a second computational device that is configured to determine a distance value for each of the two or more of the first set of points with respect to a common reference position.

17. The assembly for inspecting a metal container wherein the first computational device, second computational device or a third computational device is configured to produce a profile of the base using the determined distance value for each of the two or more of the first set of points.

18. The assembly for inspecting a metal container according to claim 17, wherein the first, second or third computational device is configured to determine one or more thicknesses of the profile using the determined thickness value for each of the two or more of the first set of points.

19. The assembly for inspecting a metal container according to claim 16, further comprising a conveyor that is configured to move the base in a forward direction during a time the X-ray beam is emitted.

20. The assembly for inspecting a metal container according to claim 16, further comprising a conveyor that is configured to move the base in a forward direction during a time the light beam is emitted.

* * * * *